United States Patent

Seessle et al.

[11] Patent Number: 4,489,754
[45] Date of Patent: Dec. 25, 1984

[54] PRESSURE RELIEF VALVE FOR CONTAINERS

[75] Inventors: Roland Seessle, Steinheim; Werner Maier, Königsbronn, both of Fed. Rep. of Germany

[73] Assignee: Deutsche Babcock Anlagen Aktiengesellschaft, Oberhausen, Fed. Rep. of Germany

[21] Appl. No.: 426,780

[22] Filed: Sep. 29, 1982

[30] Foreign Application Priority Data

Nov. 20, 1981 [DE] Fed. Rep. of Germany ....... 3146030

[51] Int. Cl.³ .............................................. F16K 17/02
[52] U.S. Cl. ..................... 137/528; 251/65; 251/118
[58] Field of Search .................. 137/528, 533, 533.17, 137/540; 251/65, 118

[56] References Cited

U.S. PATENT DOCUMENTS

| 1,159,687 | 11/1915 | Kraft | 137/540 X |
| 2,021,771 | 11/1935 | Farmer | 137/540 X |
| 2,646,071 | 7/1953 | Wagner | 137/528 |
| 2,810,541 | 10/1957 | Thomas | 251/118 |
| 2,880,750 | 4/1959 | Amison | 137/516.27 X |
| 2,888,035 | 5/1959 | Thomas | 137/543.21 X |
| 3,454,040 | 7/1969 | Dunkelis | 251/65 X |

FOREIGN PATENT DOCUMENTS 1151418 7/1963 Fed. Rep. of Germany ........ 251/65

OTHER PUBLICATIONS

IBM Technical Disclosure Bulletin; vol. 24, No. 1A; Jun. 1981; Low Pressure Release Valve.

Primary Examiner—Robert G. Nilson
Attorney, Agent, or Firm—Michael J. Striker

[57] ABSTRACT

Pressure relief valve for containers, including a ferromagnetic valve body having a hole formed therein and a sealing element for the hole, the sealing element being in the form of a disc-shaped permanent magnet having a side facing the hole formed in the valve body and an elastomer seal disposed on the side of the permanent magnet facing the hole, and a cap formed of synthetic material covering the valve.

5 Claims, 3 Drawing Figures

PRESSURE RELIEF VALVE FOR CONTAINERS

The invention relates to a pressure relief valve for a container, in particular for containers which are surrounded by a fluid for carrying off heat for cooling purposes, including a valve body having a hole formed therein and a sealing element.

There exist technical applications wherein electrical components or drives are installed in hermetically sealed containers. The components installed therein generate heat during the operation thereof, which is carried off by immersing the containers in a cooling fluid.

Under these conditions, it may happen that excessive pressure is generated inside the container by some physical or chemical processes taking place inside the container, such as by developing gases. It is necessary to reduce this excessive pressure, to avoid destruction of the container or the components installed therein.

Pressure relief valves are known devices wherein a sealing element is pressed by the restoring force of a spring against a hole or bore which is formed in the valve body. These types of valves have the disadvantage that they "creep back" to their starting position due to the spring force after the excess pressure is relieved. This means that a gap which becomes smaller and smaller is formed between the sealing elements, which permits the fluid surrounding the container to enter the container due to capillary action. This effect is very undesirable, because the cooling fluid entering the container can inhibit the functioning of the components housed therein.

It is accordingly an object of the invention to provide a pressure relief valve for containers, which overcomes the hereinafore-mentioned disadvantages of the heretofore-known devices of this general type.

With the foregoing and other objects in view there is provided, in accordance with the invention, a pressure relief valve assembly for containers, especially containers which are surrounded by a fluid for carrying off heat, for cooling purposes, comprising a valve including a ferro-magnetic valve body having a hole formed therein and a sealing element for the hole, the sealing element being in the form of a disc-shaped permanent magnet having a side facing the hole formed in the valve body and an elastomer seal disposed on the side of the permanent magnet facing the hole, and a cap formed of synthetic material covering the valve.

The pressure relief valve according to the invention has the advantage of having a progressive closing characteristic, i.e. in this valve the restoring force increases as the gap becomes smaller, in contrast to the known spring actuated valves, so that the entering of cooling fluid into the container is prevented.

In accordance with another feature of the invention, there is provided a capillary tube disposed in the hole formed in the valve body. The above-mentioned hole to be sealed, is therefore the hole in the capillary tube.

In accordance with a further feature of the invention, there is provided a pointed or sharp-edged sealing lip disposed on the valve body facing the elastomer seal.

In accordance with an added feature of the invention, the elastomer seal is formed of acrylonitrile-butadiene rubber.

In accordance with an additional feature of the invention, the cap is engaged in a groove formed in the valve body.

In accordance with a concomitant feature of the invention, the hole has a diameter of 0.15 mm.

Other features which are considered as characteristic for the invention are set forth in the appended claims.

Although the invention is illustrated and described herein as embodied in a pressure relief valve for containers, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
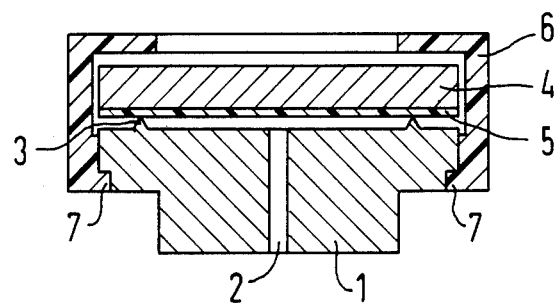
FIG. 1 is a diagrammatic cross-sectional view of the pressure relief valve according to the invention.

Referring now to the drawing and first particularly to FIG. 1 thereof, there is seen a section of a pressure relief valve according to the invention, wherein a hole 2 is formed in a valve body 1 made of a ferro-magnetic material. To obtain a good sealing effect, a pointed sealing lip 3 is provided at the valve body 1. The sealing element is formed of a disc-shaped permanent magnet 4, which is provided with an elastomer seal 5 at the side thereof that is turned toward the valve opening 2. The elastomer seal 5 assures a reliable sealing of the container in conjunction with the sealing lip 3. Furthermore, the valve is provided with a cover cap 6, having inner dimensions which are chosen in such a way that the pemanent magnet 4, even if displaced from its symmetrical position, always covers the whole area which is inside of the sealing lip 3.

It is advantageous if the cover cap 6 engages in a groove 7 formed in the valve body 1. A reliable seat or holding of the cover cap 6 is thereby achieved.

If the cooling fluid surrounding the container is a mineral oil, it serves the purpose of the invention to use an oil-resistant material for the elastomer seal 5, such as acrylonitrile-butadiene rubber.

The diameter of the hole 2 depends on the required application of the pressure relief valve. There are, however, applications in which the reduction of a slowly increasing over-pressure is required, where a sudden pressure rise should not be equalized.

For example, this is the case if condensers for alternating current are installed in a container, and these condensers are impregnated with insulating oils to avoid internal partial discharges or sparking. Though the spark intensities are greatly reduced by the impregnation, they are not completely avoided. This sparking results in the development of gas, which during longer operating periods can cause excessive pressure in the container, so that the over-pressure safety device conventionally used with such condensers is triggered, and the condenser is disconnected from the circuit network or supply. For construction reasons, the threshold pressure of this overload pressure safety cut-off lies approximately between 1 and 2.5 bar.

This slowly building over-pressure can be reduced in an advantageous way with the aid of the pressure relief valve according to the invention. On the other hand, it is not desirable to reduce a spontaneous or sudden pressure rise as it occurs, such as during an electric disruption or breakdown of the condenser, because in this case the danger of an explosion-like destruction of the condenser exists.

This can be accomplished by choosing a very small diameter for the hole 2. In this way the inner pressure during a sudden pressure rise is reduced so slowly that the over-pressure safety cut-off is triggered and the consequent damages are avoided. On the other hand, the small cross section of the hole 2 presents no obstacle for the slowly building internal pressure, so that a safe pressure reduction is assured for this condition, without having cooling fluid entering into the interior of the container.

In order to prevent the over-pressure safety cut-off from responding in the hereinafore-described application, the threshold trigger pressure of the valve must be less than 1.0 bar. This can be achieved by a suitable dimensioning of the magnetic material, and also of the area inside of the sealing lip 3 (force action on the permanent magnet 4), and in some cases by the thickness of the rubber seal 5.

Figure 2:
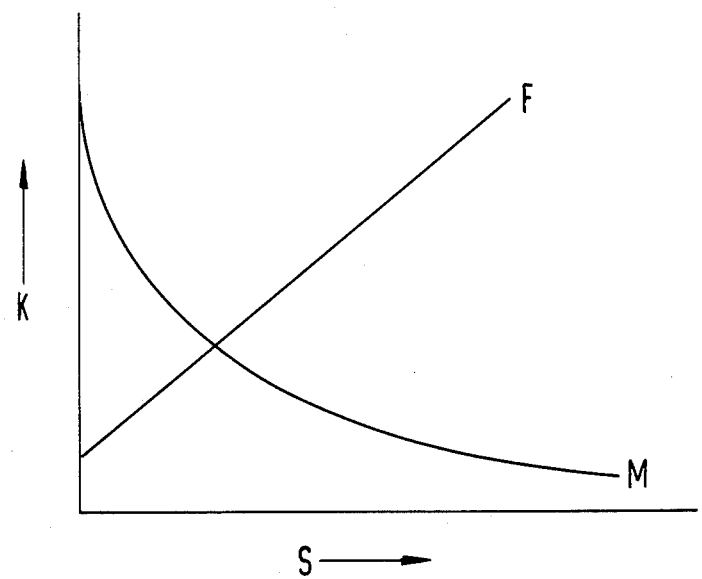
FIG. 2 is a graph of the restoring force plotted in dependence on the width of the opening gap.

FIG. 2 shows a diagram of the restoring force K in dependence on the width s of the opening gap for a conventional valve with a returning spring plotted at F, and for the valve according to the invention with a magnetic restoring or returning apparatus plotted at M. As shown in the figure, the returning force K for the valve according to the invention rises steeply with a decreasing gap opening, which guarantees a reliable closing with decreasing over-pressure, so that no cooling fluid can reach the interior of the container.

Figure 3:
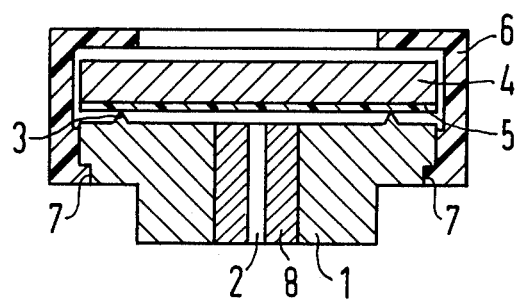
FIG. 3 is a cross-sectional view of another embodiment of the invention.

FIG. 3 shows a typical embodiment for holes 2 with a very small cross section. In such a structure it is difficult to provide such holes in the valve body 1. In this case, it is practical to construct the valve body 1 with a hole having a larger diameter and to fit a conventional, so-called capillary tube 8 into this hole. In this manner, even very small valve holes can be economically manufactured.

The foregoing is a description corresponding to German Application P 31 46 030.5, dated Nov. 20, 1981, the International Priority of which is being claimed for the instant application, and which is hereby made part of this application. Any discrepancies between the foregoing specification and the aforementioned corresponding German application are to be resolved in favor of the latter.

We claim:

1. Pressure relief valve assembly for containers, comprising a valve including a ferro-magnetic valve body having a hole formed therein, a capillary tube disposed in said hole and extending over the entire length of said hole, and a sealing element for said hole, said sealing element being in the form of a disc-shaped permanent magnet having a side facing said hole formed in said valve body and an elastomer seal disposed on said side of said permanent magnet facing said hole, said disc-shaped permanent magnet being displaceable from a position symmetrical with said valve body by pressure applied to said capillary tube, said valve body having a sealing lip formed thereon facing said elastomer seal defining a surface portion of said valve body inside said sealing lip entirely covered by said elastomer seal, and a cap formed of synthetic material covering said valve, said cap being spaced a given distance from said disc-shaped permanent magnet retaining said disc-shaped permanent magnet in a position entirely covering said surface portion when displaced.

2. Pressure relief valve according to claim 1, wherein said elastomer seal is formed of acrylonitrile-butadiene rubber.

3. Pressure relief valve according to claim 1, wherein said cap is engaged in a groove formed in said valve body.

4. Pressure relief valve according to claim 1, wherein said hole has a diameter of 0.15 mm.

5. Pressure relief valve assembly for containers, comprising a valve including a ferro-magnetic valve body having a hole formed therein, a capillary tube disposed in said hole and extending over the entire length of said hole, and a sealing element for said hole, said sealing element being in the form of a disc-shaped permanent magnet having a side facing said hole formed in said valve body and an elastomer seal disposed on said side of said permanent magnet facing said hole, and a cap formed of synthetic material covering said valve.

* * * * *